US006187375B1

(12) United States Patent
Alders et al.

(10) Patent No.: US 6,187,375 B1
(45) Date of Patent: Feb. 13, 2001

(54) METHOD OF REPAIRING COATING DEFECTS

(75) Inventors: Klaus Alders, Denkendoro; Bernhard Dill, Ingolstadt; Jörg Draeger, Hamburg, all of (DE)

(73) Assignee: Audi AG, Ingolstadt (DE)

( * ) Notice: Under 35 U.S.C. 154(b), the term of this patent shall be extended for 0 days.

(21) Appl. No.: 09/051,501

(22) PCT Filed: Oct. 15, 1996

(86) PCT No.: PCT/EP96/04481

§ 371 Date: Jun. 1, 1998

§ 102(e) Date: Jun. 1, 1998

(87) PCT Pub. No.: WO97/15403

PCT Pub. Date: May 1, 1997

(30) Foreign Application Priority Data

Oct. 20, 1995 (DE) .............................................. 195 39 065

(51) Int. Cl.[7] ............................ B05D 3/14; B32B 35/00; B05C 13/00

(52) U.S. Cl. ............................ 427/142; 427/10; 427/140

(58) Field of Search .................................... 427/140, 142, 427/10, 427, 463; 118/72

(56) References Cited

U.S. PATENT DOCUMENTS 4,066,807 * 1/1978 Craig .................................... 427/282
4,160,048 * 7/1979 Jaeger .................................. 427/142
4,233,928 * 11/1980 Hara et al. ............................ 118/35
4,522,523 * 6/1985 Vogelsang ............................ 410/126
4,599,967 * 7/1986 Murphy et al. ........................ 118/72
4,649,858 * 3/1987 Sakai et al. .......................... 118/697
4,691,426 * 9/1987 Roucek et al. .................... 29/402.18
4,835,831 * 6/1989 Melton .................................. 29/460
4,960,611 * 10/1990 Fujisawa et al. ................... 427/43.1
5,082,692 1/1992 Cavill .
5,217,744 * 6/1993 Little, Jr. ................................. 427/8
5,248,521 9/1993 Yamane .
5,256,445 10/1993 Nojiri .
5,601,051 * 2/1997 Bajek .................................. 118/306
5,745,969 * 5/1998 Yamada et al. ................... 29/402.18

FOREIGN PATENT DOCUMENTS 3833225 4/1989 (DE) .
1315374 12/1989 (JP) .
2-121709 * 5/1990 (JP) ...................................... 427/142

* cited by examiner

*Primary Examiner*—Shrive Beck
*Assistant Examiner*—Jennifer L. Kolb
(74) *Attorney, Agent, or Firm*—Michael N. Lau; Lalos & Keegan

(57) ABSTRACT

The present invention is a method and apparatus for repairing a coating defect. The apparatus includes a utility disk holder being mounted to a frame. The rotary disk contains a plurality of toolholes with a plurality of corresponding notches. A plurality of tools can be removeably secured to the plurality of toolholes. Each tool can be rotatably used to cure the coating defect.

17 Claims, 5 Drawing Sheets

Figure 1:
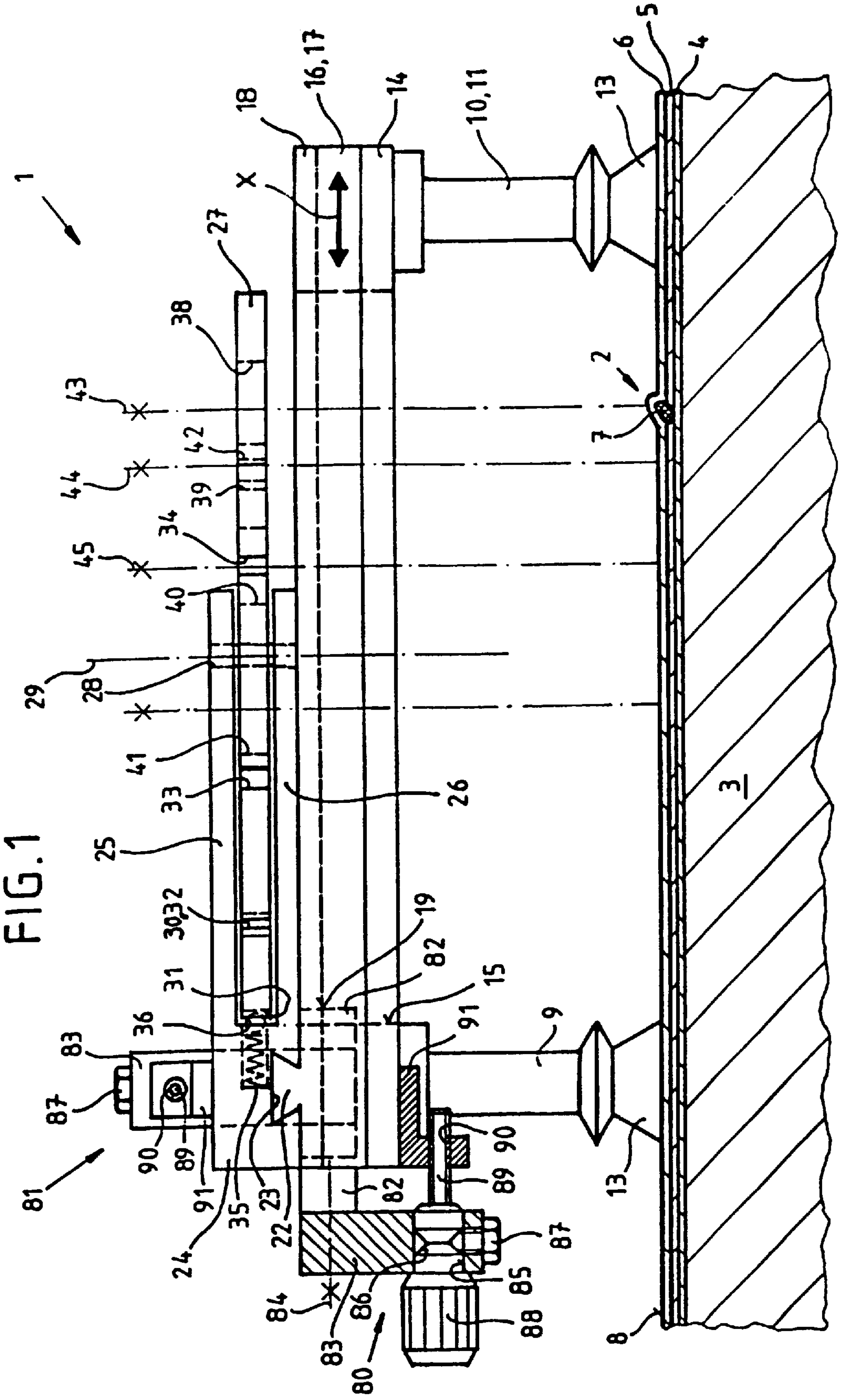

70
71
73
68
27,100
40
69
67
66
45
63
60
55
58
62
39
76
56
57
65
59
64
78
77
79
75
44
a
8
47
48
54
50
38
53
52
46
43

METHOD OF REPAIRING COATING DEFECTS

The invention relates to a process for repair of coating defects of only a small extent on a surface coating of a flat part by means of a number of repair tools which are used in succession, the surface encompassed by the repair efforts remaining essentially restricted to the extension area of the coating defect.

The process described previously for repair of coating defects is described for example in German patent disclosure document DE 38 33 225 C2 (B 05 D 3/06). Here especially a process is discussed for repair of the enamel coating in motor vehicle chassis, in which the enamel defects are caused for example by particles of dust or drops of oil. The range of applications extends of course also to enamel coatings in a wide range of general articles, for example, housings in electrical devices.

In the approach described in DE 38 33 225 C2 the following repair tools are used:

Spot elimination of coating defects takes place by means of laser beam, the repair mixture is applied with the aid of a carrier foil and via the action of the laser beam or alternatively in liquid form via a metering device, subsequent setting takes place at room temperature or even supported by hot air, hot gas or other heat effects (for example, infrared radiation, electron beams, induction heating, UV heating), while finally a suitable grinding device can be used for final smoothing.

Patent DE 38 33 225 C2 says nothing specific about handling of the repair tools which had been described previously and which must be positioned individually relative to a repair site of very small extent. In addition, the use of a laser beam device for this purpose entails an almost unreasonable equipment complexity which is also associated with accordingly high cost.

Alternatively, in Japanese patent application 1-315374 (B 05 D 7/14) for removal of a coating defect (for example, a particle of dust) a mechanical cutting machine dimensioned accordingly is proposed which likewise is designed to penetrate only the desired small depth into the surface coating. However this cannot be done with the means shown. The scale of the representation in FIG. 1*b* of this patent application is completely distorted. Thus, in the representation the diameter of the cutting machine corresponds approximately to the sum of the enamel layer thicknesses which in practice is roughly in the range of 50 $\mu$m. To be able to remove a coating defect (for example, a particle of dust) the cutting machine would conversely have to have a multiple (for example 2 mm diameter) of the size shown. Due to the conical shape of the tip of the cutting machine this would mean that the tip would already have penetrated all coatings before the edge area of the tip of the cutting machine had reached the uppermost layer. Proper repair of a coating defect cannot be done in this way. After filling with coating mass, distorted light refraction would result since optical disturbances occur in and on the individual enamel layers.

The object of the invention is to optimize the process for repair of coating defects given in the preamble of patent claim 1 such that good handling of the individual repair tools is ensured and that the repair can be done quickly using them with the same repair quality.

This process has the further features according to the characterizing part of claim 1 as claimed in the invention. In claim 4 one especially well-suited device for executing the process is indicated.

Advantageous embodiments and developments are claimed with the subclaims. The embodiments explained below of the device being used illustrate the invention in detail, reference being made to the pertinent drawings.

Figure 2:
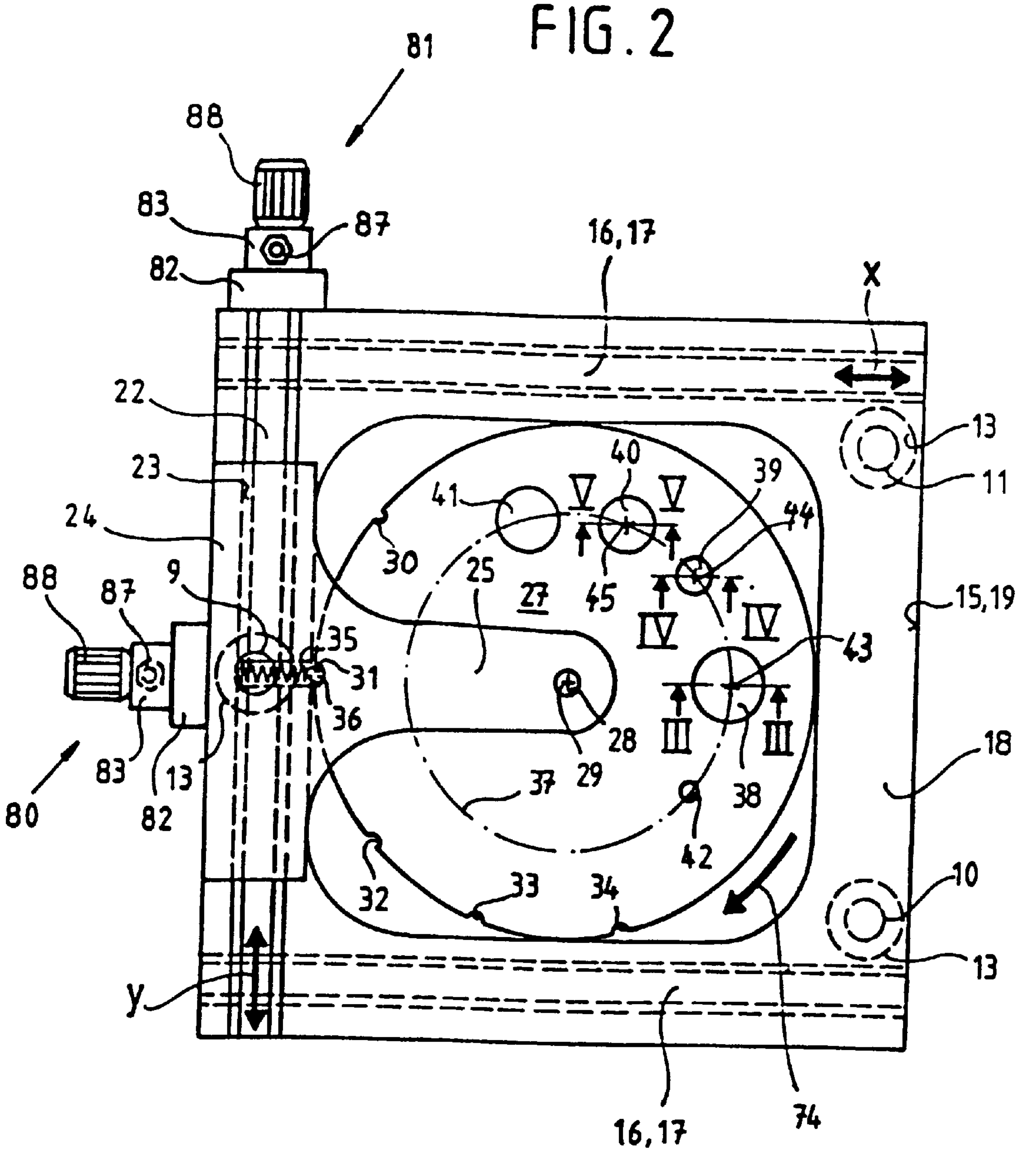
Figures 3, 4, 5:
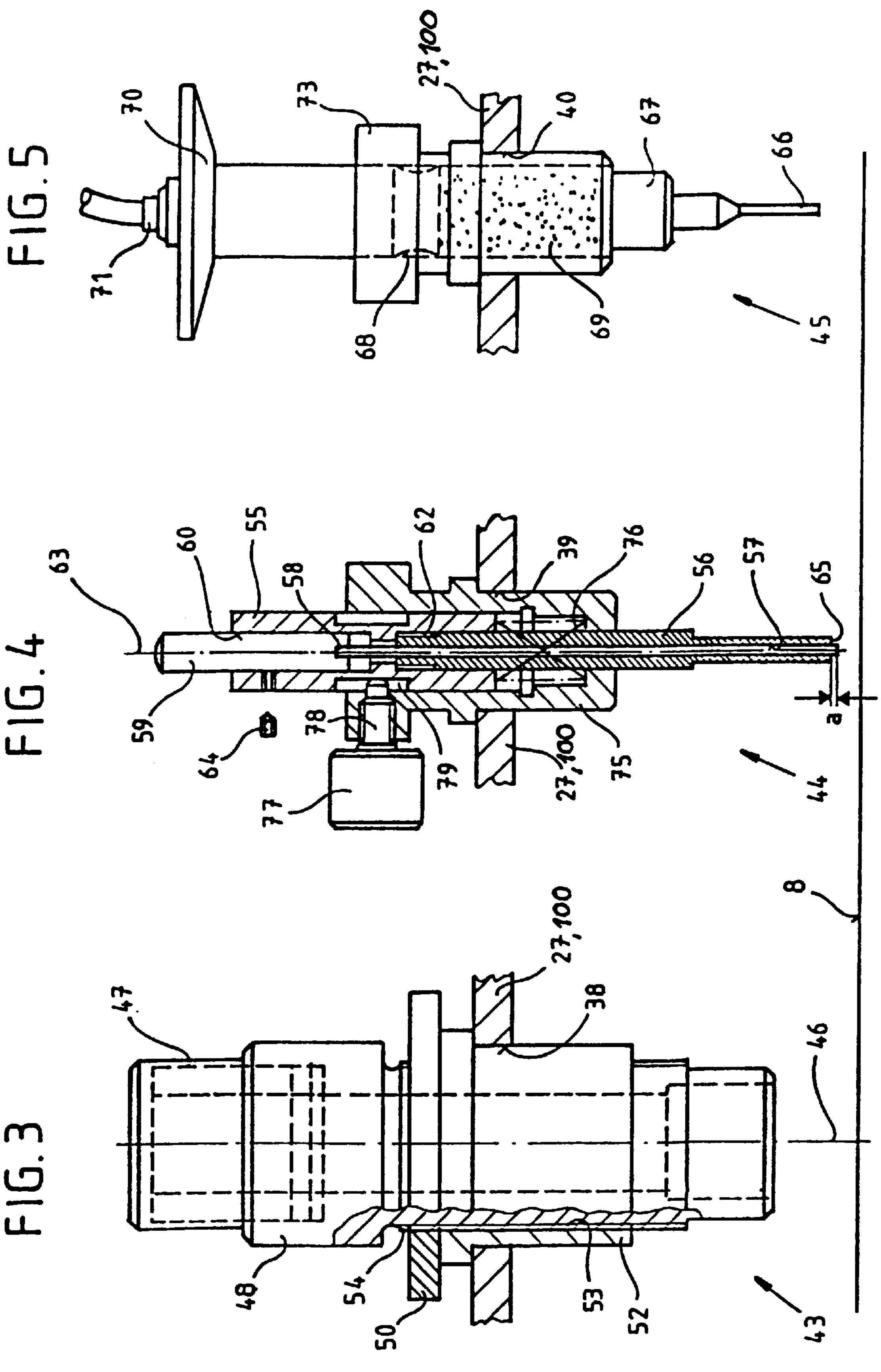
Figure 6:
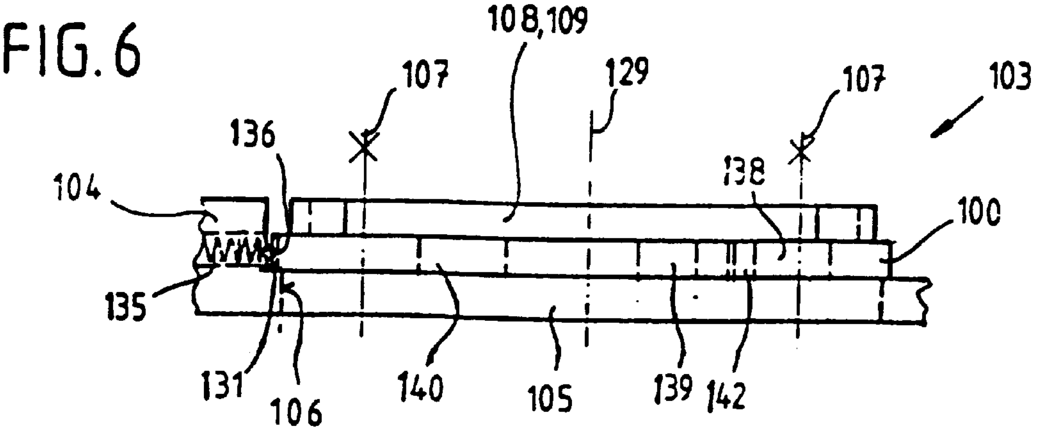
Figure 7:
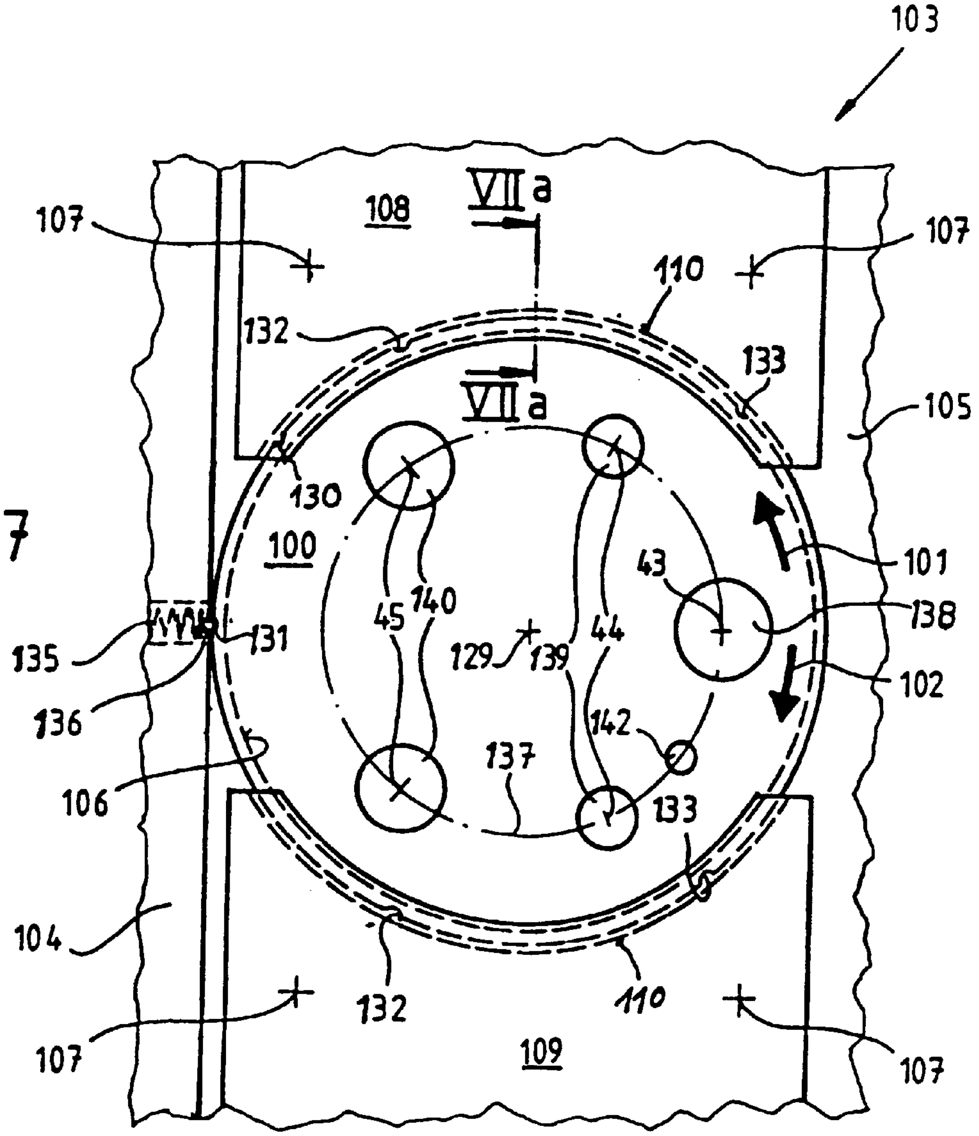
Figure 7A:
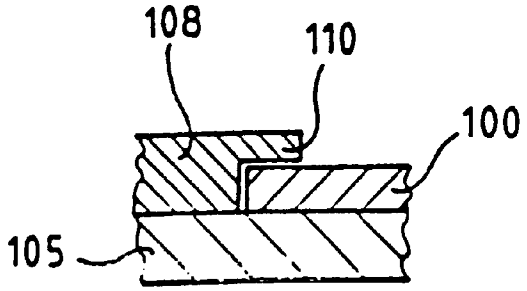
Figure 8:
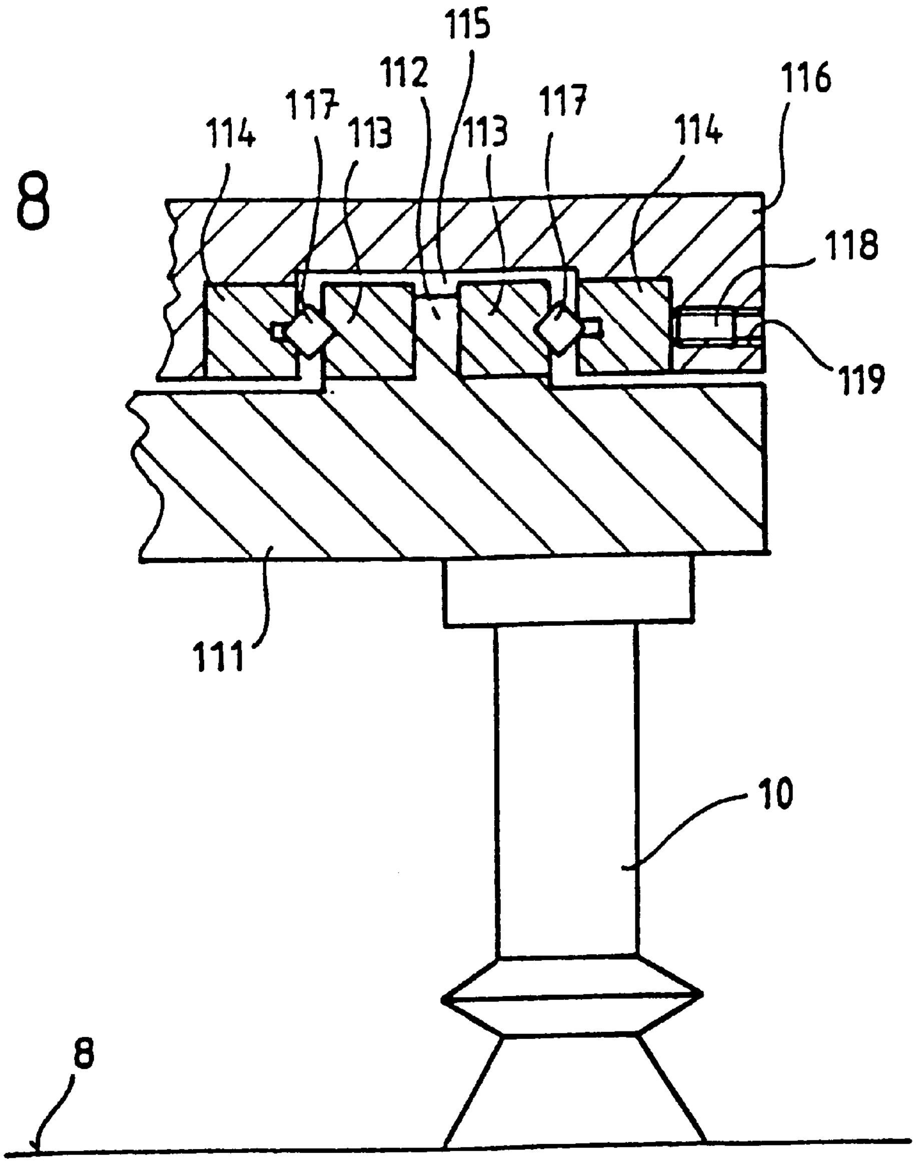

FIGS. 1 and 2 show in two views (side view, overhead view on a smaller scale) the basic structure of a device for repair of coating defects, FIG. 3 shows a view according to line III in FIG. 2 with representation of the target optics, FIG. 4 shows a view according to line IV in FIG. 2 with a milling unit, FIG. 5 shows a view according to line V in FIG. 2 with a metering unit, FIGS. 6 and 7 show one alternative embodiment of a turret disk with holder, FIG. 7*a* shows a cross section according to line VII a in FIG. 7 and FIG. 8 shows a roller bearing being used alternatively (for the dovetail guide).

As follows from FIGS. 1 and 2, a device 1 for repair of a coating defect 2 sits on a flat part 3 to be treated, for example part of the chassis of a motor vehicle. The surface coating, for example, enamel, can have one or more parts and in the embodiment consists of three layers, specifically primer 4, base enamel 5 and clear enamel 6. The coating defect is in the form of a dust particle 7 which is enclosed in the area between the base enamel 5 and clear enamel 6, by which a slight elevation of the otherwise even surface 8 results. Of course it is also conceivable that the coating defect encompasses only one or all enamel layers.

The device 1 is supported via three support feet 9, 10, 11 which form the corner points of a triangle on the part surface 8, the actual contact surfaces being formed by vacuum chucks 13 (for example type FSGA 22⅛" from Schmalz, optionally with connected supply lines for negative pressure) which ensure secure, immovable fixing of the device 1 on the part surface 8. The vacuum chucks 13 are especially recommended when the flat part 3 consists of a nonmagnetizable material (for example, aluminum, plastic). If on the other hand it consists of a corresponding material, use of permanent magnets or electromagnets is recommended. They should preferably have an adhesive force of 5–10 N (newtons). The magnetic foot should be gimballed relative to the respective support foot 9, 10, 11 and should have a coated adhesive side. This adhesive side (contact surface with the part surface 8) should moreover have a slightly concave ground area.

Support feet 9, 10, 11 are used to directly hold a base frame 14 with a square base surface and a central, essentially likewise square recess 15. The top of the base frame 14 which faces away from the support feet 9, 10, 11 in the area of two opposite side edges and running parallel to them has crosspieces 16 which with the correspondingly arranged grooves 17 in the bottom of a support frame 18 which lies on the base frame 14 furnish a dovetail guide. Support frame 18 has the same square outer contour as base frame 14 and furthermore has a recess 19 which corresponds to the base frame recess 15 so that the two frames 14, 18 are congruent.

Dovetail guides 16, 17 thus yield the possibility of displacement of support frame 18 relative to the flat part 3 along one x-component (compare double arrow).

On the side of the support frame 18 facing away from the dovetail guides 16, 17 and aligned orthogonally to the indicated dovetail guides 16, 17 and thus running parallel to another side edge of the support frame 18 aligned accordingly, there is another crosspiece 22 which with a groove 23 of a t-shaped disk carrier 24 furnishes another dovetail guide. In this way relative displacement between the disk carrier 24 and the support frame 18 along a y component (double arrow) is possible, so that ultimately the disk carrier 24 has relative to the flat part 3 and in degrees of freedom of movement [sic].

Relative motion between the base frame 15 and the support frame 18 or between the support frame 18 and the disk carrier 24 takes place as follows:

For control movements in the x and y direction there are two actuating units 80, 81 with identical structure. Roughly in the middle between the dovetail guides 16, 17 (actuating unit 80) or in the area of dovetail guide 22, 23 (actuating unit 81) via spacer 83 a clip 83 which extends away to the bottom or top is attached to the side edges of the support frame 18 which are adjacent to one another (attachment screw 84). In the opposite end area of the clip 83 a screw 88 is inserted into a hole 85, with a capacity to turn, but not move axially (fixing screw 87 which is screwed into the clip 83 on the face side fits into notch 86 in the screw shaft). The threaded shaft 89 of the screw interacts with a threaded hole 90 in an L-shaped clip 91 which is attached to the bottom of the base frame 14 (actuating unit 80) or to the top of the disk carrier 24 (actuating unit 81). The threaded shaft 89 of set screws 88 are preferably provided with fine threads to that sensitive and exact relative displacement motion of the parts can take place.

As furthermore follows from FIGS. 1 and 2, a longitudinal crosspiece of the t-shaped disk carrier 24 is made in two parts consisting of two support arms 25, 26 which are spaced apart, which are located on top of one another, and which hold a turret disk 27 of transparent material (for example, silicate glass) between themselves and support it centrally via a bearing point 28.

The outside diameter of the turret disk 27 corresponds roughly to the edge length of the two recesses 15, 19 which are essentially square. Along the peripheral line of the turret disk 27 a number of notches 30–34 are machined which each interwork with a spring-loaded (compression spring 35) catch ball 36 which is inserted in the center into the disk carrier 36 and thus can lock the turret disk 27 in given swivel positions.

Diametrically opposite the notches 30–34 and on a concentric (axis of rotation 29) circular line 37 a number of tool holes 38–42 are machined into the turret disk 27. As is apparent from FIGS. 3–5, target optics 43 are inserted into the tool hole 38, while the tool hole 39 bears a milling unit 44 to be operated by hand and finally the tool hole 40 accommodates a feed and metering unit 45 for the repair mixture. Target optics tool hole 38 is downstream of the small hole 42 for rough visual positioning of the device 1 above the coating defect 2 when placed on the flat part 3.

The tool hole 41 is first unoccupied, but can optionally be equipped with another feed and metering unit if two different repair mixtures (for example, base enamel and clear enamel) would have to be placed in succession in the defect from which the coating defect has been removed in the surface coating by the milling unit 44 beforehand. If the repair mixture is not of the type which sets below room temperature, alternatively the tool hole 41 could also be equipped with a suitable drying unit. If, as is the case in the initially cited prior art, under certain circumstances a grinding unit for final surface treatment were recommended, it could also alternatively be inserted into the tool hole 41. If ultimately the tool holes 38–42 provided in the embodiment should not be sufficient, the turret disk 27 along the indicated circular line 37 offers enough space to provide other tool holes for the function units to be inserted accordingly therein. It would also be conceivable, for example, to place on the support arm 25 a (battery-operated) non-glare illumination means to enable recognition and elimination of even the smallest coating defects.

The target optics 43 shown in schematic form in FIG. 3 on an enlarged scale are used to position the circular line 37 and thus the repair tools which follow the target optics 43 and which are located on it (milling unit 44, feed and metering unit 45, etc.) exactly above the coating defect 2 to be repaired. Based on prepositioning by means of a hole 42 only small adjustment motions of the actuating units 80, 81 are necessary for this purpose.

The target optics 43 can have the basic structure known in the prior art. Their longitudinal axis 46 relative to the plane of the turret disk 27 and thus also relative to the part surface 8 is aligned orthogonally. It has a sleeve 48 which surrounds an eyepiece support 47 and which conventionally holds a lens with calibration crosshairs machined in it. Since, depending on the given circumstances, the distance of target optics 43 to the part surface 8 is not always constant, fine adjustment is necessary. This is done by means of axial adjustment of the sleeve 48.

This is done by inserting a sleeve seat 52 into the tool hole 38 of the turret disk 27 and attaching it there (for example, using cement); the seat has an internal thread 53 which interacts with an external thread 54 machined on the outer periphery of the sleeve 48. A lock 50 is used to fix the adjusted position. Alternatively there can be a worm drive.

In FIG. 4 on an enlarged scale one embodiment of a milling unit 44 is shown. It consists of a sleeve handle 55, a depth stop sleeve 56 which is inserted therein, a cutter pin 58 which is guided in a central through hole 57 thereof with the pertinent head part 59 which in turn is guided to move lengthwise in a concentric hole 60 of the sleeve handle 55.

The depth stop sleeve 56 is detachably connected via a thread 62 to the sleeve handle 55 for purposes of possible dismounting of the entire milling unit 44. Since the coating defect to be eliminated can be of different sizes, the depth stop sleeve 56 and cutter pin 58 with the head part 59 can be made interchangeable as a set, depending on the desired cutter working diameter (for example, 2 mm). Furthermore, depending on the application and the occurrence of coating defects it can be necessary to penetrate into the part surface 8 with the cutter pin 58 which has a flat cutting edge geometry aligned parallel to the part surface 8 (facing-type cutter) to various depths (roughly 0.01 to 0.05 mm) and to remove only one, two or all coating layers.

To maintain a depth setting here, the milling unit 58 is moved down by shifting the head part 59 until it projects with the desired depth measurement (measurement -a- in FIG. 4) from the depth stop sleeve 56, after which fixing in this position can be done using a stud screw 64.

To be able to set the exact depth measurement -a-, a calibration foil is used which has a corresponding foil thickness -a-, which is placed on a base, and which is provided with at least one hole which is slightly larger than the diameter of the cutter pin 58. The unit consisting of the cutter pin 58, the head part, the depth stop sleeve 56 and sleeve handle 55 is seated on this calibration foil and in doing so the cutter pin 58 is moved downward until it touches the base.

This unit is in turn held by a sleeve 75 which is inserted into the tool hole 39 of the turret disk 27 and attached there (for example, cemented). To be able to initiate a reset motion after manipulating the cutter pin 58, into the sleeve 75 is inserted a compression spring 76 which is supported on the bottom of the sleeve handle 55. A set screw 77 which is furthermore inserted into the sleeve 75 fits with its screw shaft 78 into a peripheral groove 79 of the sleeve handle 55 and thus limits its axial displacement capacity.

When removing the coating defect 2, the manually moved (electric motor drive would also be conceivable) cutter pin 58 penetrates into the part surface 8 until the contact collar 65 of the depth stop sleeve 56 comes to rest against the part surface 8.

When this working step is completed, the turret disk 27 is swivelled (arrow 74) until the feed and metering unit 45 comes to rest exactly over the coating defect 2 to be repaired. This occurs necessarily due to the arrangement of the repair tools along the circular line 37 or by the additional ball catch (notch 32, catch ball 36).

Basic positioning of the entire device 1 for repairing a coating defect 2 is done, as already mentioned, such that it is placed on the part surface 8 and fixed there by visual check above the hole 42 (vacuum chuck 13) such that the hole 42 and thus the circular line 37 of the turret disk 27 comes to rest roughly above the coating defect 2 to be repaired. With a subsequent X-Y displacement of the support frame 18 and the disk carrier 24 then with the simultaneous aid of the target optics 43 (in the engaged state of turret disk 27 by means of notch 31) the exact position is found.

The feed and metering unit 45 (compare FIG. 5) for the repair mixture can be a module which is known in the prior art and which is used for comparable cases (for example, the EFD Ultra-System, automatic metering device 1500 WL, from EFO). It allows exact adjustment of the metering time and metering amount. The important components are a metering needle 66 which is placed on the end side, a cartridge 67 which holds it with plug 68 inserted therein, which limits the space for the added repair mixture 69, and a head part 70 which closes the cartridge 67 to the top and into which a compressed air connection 71 discharges. For purposes of axial displacement of the feed and metering unit 45 in a sleeve 73 which holds it and which is held in the tool hole 40 of the turret disk 27, the inside diameter of the sleeve 73 and the outside diameter of the cartridge 67 are matched to one another such that the feed and metering device 45 is held by friction.

After removing particles of dust 7 by means of cutter pin 58, by means of the feed and metering unit 45 an exactly metered enamel or repair mixture 69 is delivered into the resulting cavity. Depending on the depth of the cavity, this repair mixture 69 can consist only of a clear enamel, or a base enamel first and in a second step a clear enamel which covers it can be added.

With regard to the construction and operation of the feed and metering unit, the composition of the enamel or repair mixture and with respect to the type and manner of its introduction into the cavity of the routed-out coating defect 2, many possible variables are conceivable. Thus, the enamel and repair mixture can be a liquid, paste, or powder. It can be placed in the cavity in droplets or by spray, by means of gravity, pneumatically, hydraulically or using a piezocrystal. The enamel or repair mixture can also be recompacted after addition to the cavity with the corresponding tool (for example, a pin or single-wall or multi-wall needle), i.e., it can be pressed onto the base of the cavity. Furthermore, the enamel or repair mixture can be added to the cavity as a foil with an adhesive layer. For this reason use of a gripping device for example can also be helpful. Optionally insertion by means of a commercial enamel stick is also possible. Use of a pipette, for example, from EPPENDORF (for example, the RESPONSE 4850) is also possible.

FIGS. 6 and 7 show one alternative embodiment of a disk carrier or turret disk in two views. The turret disk 100 in turn is equipped with a number of tool holes 138 to 140, 142 for rough prepositioning of the entire device 103 when seated on the flat part 3 or to hold target optics 43, the milling unit 44, and the feed and metering unit 45. All the tool holes 138 to 140, 142 are in turn located on a circular line 137 (compare the axis of rotation 129). There are also notches 130–133 which interact with the spring-loaded (compression spring 135) catch ball and which are known from the previously described embodiment, diametrically opposite each tool hole.

As one special feature compared to the embodiment shown in FIGS. 1 and 2, on the turret disk 100 proceeding from the target optics 43 in both swivel directions (arrow 101, 102) there are one milling unit 44 and one feed and metering unit 45 each. Thus it becomes possible to outfit the turret disk 100 at the same time with milling units with for example cutter pins of different dimensions or with feed and metering units with different enamel and repair mixtures. In this way the repair of a coating defect can be done more quickly or coating defects of different sizes can be corrected without interchanging any parts of the device. It goes without saying that this arrangement can also be provided in a device according to the embodiment as shown in FIGS. 1 and 2.

In FIGS. 6 and 7 essentially only the components modified relative to the embodiment in FIGS. 1 and 2 are shown. With respect to the other function elements, reference is made to the corresponding versions for the embodiment as shown in FIGS. 1 and 2.

A disk carrier 104 has a lower support frame 105 which is provided with a circular cutout 106 which has a diameter which is somewhat smaller than the outside diameter of the turret disk 100 so that it can be located concentrically thereon.

The turret disk 100 is held and guided ultimately by two disk holders 108, 109 which are attached to the lower support frame 105 (attachment screws 107) and which are diametrically opposite one another; their side facing the turret disk 100 at the time is curved accordingly to prevent hindering the free movement of the units mounted on the turret disk 100. Otherwise each disk holder 108, 109 on the indicated side has a shoulder 110 which is curved in the shape of a circle; its radius of curvature is slightly greater than that of the turret disk 100 and its height is somewhat greater than the thickness of the turret disk 100, so that it is subject to narrow tolerances, but can still be moved relatively freely (turned). In doing so each disk holder 108, 109 overlaps the turret disk 100 in the edge area, as can be recognized in FIG. 7*a*.

One design version in contrast to the dovetail guides 16, 17 or 22, 23 according to the embodiment shown in FIGS. 1 and 2 is shown in FIG. 8. In this version guide rollers are used. For this reason the base frame 111 has a roller seat carrier 112 for the roller seats 113 which are located thereon on each side and which are extended lengthwise (extending over the length of the base frame 111) and are joined securely to the base frame 111 (for example, by means of attachment screws). To these holders are assigned other roller seats 114 which are extended correspondingly lengthwise and which are inserted into a recess 115 in the support frame 116. Between the adjacent roller seats 113, 114, obliquely positioned cylinder roller bearings 117 are inserted which are also able to accommodate vertical forces. The entire guide roller can be prestressed via thrust screws 118 which act on the roller seat 114 on the support frame side and which are inserted into the threaded holes 119 in the support frame 116.

Other structural modifications of the device 1, 103 for repairing a coating defect 2 or the repair tools used in doing so which lie within the framework of the invention are easily conceivable. Instead, of a facing-type cutter, use of a drill with a flat face surface would be conceivable, for example. It would also be conceivable to modify the device 1, 103 such that the individual repair tools come to rest not along a circular line, but that the individual tool holes for them lie on a straight line, of course then instead of turret disk a support plate or the like guided correspondingly lengthwise or the like having to be used, Designing the tool carrier such that only a single repair tool has room there in a correspondingly shaped seat would also be conceivable. After completed positioning and calibration, for example by optical calibration means used first, the repair tools could then be inserted into the seat and used there.

It would also be conceivable to integrate additional optics into the device, by means of which the machining processes could be monitored/observed.

What is claimed is:

1. A process for repairing a coating defect on a surface coating of a flat part by a plurality of repair tools, comprising the steps of:

removably mounting the plurality of repair tools and an optical calibration device on a holder;

positioning and calibrating the holder by the optical calibration device;

moving and using the plurality of repair tools in succession into their correct working positions;

performing first a coarse calibration; and performing second a fine calibration.

2. The process as claimed in claim 1, further comprising the step of:

using a cutter to remove the coating defect.

3. A device for executing the process as claimed in claim 1, wherein both the optical calibration device and the plurality of repair tools are located on a tool carrier, the tool carrier being located in a base frame placed on the flat part to be moved via a plurality of interposed support elements.

4. Device as claimed in claim 3, wherein a hole which is used for rough positioning, target optics, milling unit and a feed and metering unit for the repair mixture are located along a concentric circular line of a turret disk and are inserted into tool holes of the latter, the revolver turret being held to swivel around its axis of rotation by a x-y positioning unit.

5. Device as claimed in claim 4, wherein the x-y positioning unit consists of a base frame which is provided with support feet and which accommodate a support frame which can be moved relative to it and which carries a disk carrier which can be moved relative to it and the disc carrier holds the turret disk.

6. Device as claimed in claim 5, wherein the base frame and support frame as well the disk carrier are joined to one another via dovetail guides and can be moved relative to one another.

7. Device as claimed in claim 6, wherein the dovetail guides are replaced by guide rollers.

8. Device as claimed in claim 5, wherein the control motions in the x and y direction take place via positioning units, each consisting of a clip which is attached via spacers to one side edge of the support frame and into which a set screw is inserted with a thread shaft which interacts with a threaded hole in an L-shaped clip which is attached to the part adjacent to the support frame.

9. Device as claimed in claim 5, wherein the disk carrier is made T-shaped and consists of two support arms which are spaced apart, which are located on top of one another, and which hold the turret disk between themselves.

10. Device as claimed in claim 5, wherein the disk carrier has a lower support frame with a circular cutout on which the turret disk lies concentrically, wherein two disk holders which are attached to the lower support frame and which are diametrically opposite one another are furthermore assigned to the turret disk and each have a shoulder which is curved in the shape of a circle to mount the turret disk.

11. Device as claimed in claim 4, wherein diametrically opposed notches which interact which the device-side catch and which are attached along the peripheral line of the turret disk are assigned to the tool holes.

12. Device as claimed in claim 4, wherein proceeding from the target optics in one swivel direction of the turret disk there are in succession a milling unit and a feed and metering unit.

13. Device as claimed in claim 4, wherein proceeding from the target optics in both swivel directions of the turret disk there are in succession milling units and feed and metering units.

14. Device as claimed in claim 4, wherein the target optics have a sleeve which surrounds an eyepiece support and which holds a lens with machined calibration crosshairs, wherein furthermore sleeve seat which is inserted into the tool hole of the turret disk bears an internal thread which interacts with an external thread machined on the outside periphery of the sleeve.

15. Device as claimed in claim 4, wherein the milling unit consists of a sleeve handle, a depth stop sleeve which is inserted therein, a cutter pin which is guided in a central through hole thereof, with the pertinent head part which in turn is guided to move lengthwise in a concentric hole of the sleeve handle.

16. Device as claimed in claim 15, wherein the milling unit is accommodated by a sleeve which is inserted into a tool hole of the turret disk and is attached there, wherein into sleeve a compression spring is inserted which is supported on the bottom of sleeve handle, a set screw which fits into the sleeve in interaction with a peripheral groove of the sleeve handle limiting its axial displacement capacity.

17. Device as claimed in claim 4, wherein the feed and metering unit for the repair mixture consists of an end-side metering needle, a cartridge which holds it, with plug inserted therein, and a head part which closes the cartridge to the top, for purposes of axial displacement of the feed and metering unit the latter being surround by a sleeve which holds it and which is held in the tool hole of the turret disk by friction.

* * * * *